(12) United States Patent
Sollier (10) Patent No.: US 6,848,474 B2
(45) Date of Patent: Feb. 1, 2005

(54) CONTROL DEVICE FOR A FLOW OF FLUID

(75) Inventor: Ghislain Sollier, Ville en Sallaz (FR)

(73) Assignee: G. Cartier Technologies, Cluses (FR)

( * ) Notice: Subject to any disclaimer, the term of this patent is extended or adjusted under 35 U.S.C. 154(b) by 0 days.

(21) Appl. No.: 10/471,131

(22) PCT Filed: Mar. 6, 2002

(86) PCT No.: PCT/FR02/00796

§ 371 (c)(1),
(2), (4) Date: Sep. 5, 2003

(87) PCT Pub. No.: WO02/070936

PCT Pub. Date: Sep. 12, 2002

(65) Prior Publication Data

US 2004/0069355 A1 Apr. 15, 2004

(30) Foreign Application Priority Data

Mar. 6, 2001 (FR) .............................. 01 03130

(51) Int. Cl.$^7$ .............................................. F16K 31/02
(52) U.S. Cl. ........................... 137/613; 137/65; 251/69; 251/129.15
(58) Field of Search ........................... 137/65, 66, 613; 251/129.15, 129.01, 66, 68, 69

(56) References Cited

U.S. PATENT DOCUMENTS

| | | | |
|---|---|---|---|
| 3,273,095 A | | 9/1966 | Rossenbeck |
| 3,808,895 A | * | 5/1974 | Fitzwater ..................... 251/69 |
| 4,997,069 A | * | 3/1991 | Strache ........................ 251/71 |
| 5,199,456 A | | 4/1993 | Love et al. |
| 6,672,326 B2 | | 1/2004 | Pappalardo et al. |

FOREIGN PATENT DOCUMENTS

| | | |
|---|---|---|
| DE | 69 22 573 | 10/1969 |
| DE | 18 06 094 B | 1/1970 |
| DE | 20 22 863 | 11/1971 |
| DE | 26 43 550 | 3/1978 |
| DE | 82 25 214 | 12/1985 |
| DE | 299 11 769 U | 10/1999 |
| EP | 1 106 923 | 6/2001 |

* cited by examiner

Primary Examiner—Kevin Lee
(74) Attorney, Agent, or Firm—RatnerPrestia (57) ABSTRACT

The invention relates to a device comprising at least one safety shut-off control valve. A safety valve is optionally connected to said safety shut-off control valve, connected in series in the fluid flow path. In the safety shut-off control valve, a sealing valve is returned to a sealing position against a seat by means of a return spring, and is controlled by a linear actuator and a connecting rod for continuous adjustment of the valve opening. The connecting rod comprises two independent segments which are at least partially made from a ferromagnetic material and which are magnetically coupled to a magnetic coupling circuit that is activated by a coil. While electric power is being supplied to the coil, the magnetic field that said coil creates maintains the linking rod segments coupled to one another, such that the linear actuator can control the sealing valve. Once the power being supplied to the operating coil is interrupted, the segments separate and the sealing valve returns to said sealing position regardless of the position of the linear actuator. At the same time, the check valve of the safety valve is pushed back to the sealing position by a return spring. In this way, a continuous control valve with a double safety system is produced.

10 Claims, 7 Drawing Sheets

CONTROL DEVICE FOR A FLOW OF FLUID

This application is a U.S. national phase application of PCT International Application No. PCT/FRO2/00796 filed Mar. 6, 2002.

TECHNICAL FIELD OF THE INVENTION

The present invention relates to electromagnetic valves for controlling a fluid flowrate in a fluid circulation path.

Such valves are used in particular to adjust the gas flowrate feeding a gas burner or boiler.

Already known in the art are solenoid valves for continuous adjustment of the gas flowrate by means of a sealing valve moving axially and cooperating with a seat to determine in the gas passage a gas passage section that is adjustable between a fully open position and a minimum open position. As a general rule, solenoid valves enabling continuous adjustment of the gas flowrate do not provide an adjustment going as far as total shut-off, and a shut-off valve must be associated with them.

There is also known, for adjusting the gas flowrate, a technology employing a plurality of valves connected in parallel and each passing a portion of the maximum gas flowrate. In this case, each solenoid valve can totally shut off its own passage, closure of all of the valves completely shutting off the gas passage. The drawback is discontinuous adjustment of the gas flowrate, each solenoid valve defining an adjustment plateau.

In all cases, the standards currently in force governing the control of gas flows impose the provision of two safety systems in series, one after the other, to ensure safe shut-off in the event of failure of the electrical power supply to the solenoid valve.

In the technology employing a plurality of valves connected in parallel, it is therefore necessary to add a safety solenoid valve in series with the set of parallel solenoid valves.

In the continuous adjustment solenoid valve technology, where the continuous adjustment solenoid valve is associated with a total shut-off solenoid valve, it is also necessary to add a safety solenoid valve to ensure double shut-off in the event of failure of the electrical power supply.

Clearly the systems referred to above make the device very complicated, necessitating the simultaneous use of a plurality of solenoid valves and their control circuits.

There is also known, from the document DE 18 06 094 B, a double safety solenoid valve operating in on/off mode. In the above document, the sealing valve is mounted at the end of a tubular body in which slides an actuator rod fastened to a drive magnetic core. The drive magnetic core is driven by a drive coil which generates a magnetic field causing axial movement of the magnetic drive core. A failsafe second magnetic core can move axially relative to the first drive magnetic core, from which it is separated by a non-magnetic ring. The failsafe second magnetic core is spring-loaded in the direction of the sealing valve, and is magnetically driven by a failsafe second coil which generates a magnetic field causing axial movement of the failsafe second core. The sealing valve is urged by a spring toward the valve seat. A device of this kind does not provide continuous adjustment of the position of the sealing valve facing the seat: the valve operates in on/off mode, the sealing valve being able to assume only a fully open position and a closed position, according to the state of energization of the coils. Also, the drive magnetic core is not fastened to the sealing valve, but is connected to the sealing valve by a rod sliding in a cylindrical body which is fastened to the sealing valve. Further, to open the valve, it is necessary to generate a strong magnetic field to cause the magnetic cores to stick to each other, which necessitates powerful and bulky coils.

SUMMARY OF THE INVENTION

The problem addressed by the present invention is that of ensuring, at one and the same time, firstly continuous adjustment of the fluid flowrate in a fluid circulation path, and secondly safe shut-off in the event of failure of the electrical power supply to the solenoid valves, and of achieving this using a small number of solenoid valves and control circuits, to simplify the device and reduce its cost.

Another problem that certain embodiments of the invention aim to solve is that of controlling the adjustment solenoid valve by means of a motor, for continuous and accurate adjustment, whilst ensuring automatic return of the motor to the solenoid valve shut-off position without risk of crushing or of amplification of the phenomenon of sticking of the seals and with no risk of slippage or jamming of the motor.

To achieve the above and other objects, the invention provides a control and safety device for a flow of fluid through a fluid circulation path through a main body of the device, which includes:

an axial displacement sealing valve cooperating with a seat to determine, in the fluid passage, a fluid passage section adjustable between a fully open position and a shut-off position, a linear actuator directly mechanically connected to the sealing valve by an axial displacement connecting rod for continuously and axially moving the sealing valve facing the seat between its fully open and shut-off positions, enabling continuous adjustment of the position of the sealing valve facing the seat;

according to the invention:

the connecting rod includes a first segment and a second segment which are coaxial and independent, the first segment being fastened to, or integral with, the sealing valve, the second segment being driven by the linear actuator, and the two segments being able to move axially relative to each other between a relatively close together position and a relatively far apart position relative to the airgap, each of the first and second segments of the connecting rod comprises at least one respective ferromagnetic material connecting portion, two respective contact surfaces of the two connecting portions facing each other, a return spring urges the sealing valve and the first segment of the connecting rod away from the second segment of the connecting rod to spring-load the sealing valve into the shut-off position, a magnetic coupling circuit with an excitation coil is magnetically coupled to the connecting portions of the segments of the connecting rod and is shaped to generate selectively a magnetic field circulating between the two connecting portions of the segments of the connecting rod, said magnetic field causing mutual magnetic attraction of the segments of the connecting rod toward each other against a return force exerted by the return spring, said magnetic attraction being greater than the return force of the return spring when the two segments are in the relatively close together position.

Thus supplying power to the excitation coil causes the connecting rod segments to stick to each other, ensuring mechanical coupling of the sealing valve to the linear actuator for its functional movements, and interrupting the power supply to the excitation coil causes the connecting rod segments to be released from each other, ensuring decoupling of the sealing valve, which is then returned to the shut-off position by the return spring, regardless of the status of the linear actuator.

In the description and the claims, the expression "linear actuator" designates any member for moving the sealing valve axially and continuously to and maintaining it in any position between the fully open and closed limit positions, a member of this kind remaining fixed in position in the event of interruption of the electrical power supply. One example of this kind of linear actuator is a rotary motor associated with a screw jack.

According to one option, the connecting portions of the segments of the connecting rod have respective plane contact surfaces.

Alternatively, the connecting portions of the segments of the connecting rod have respective corresponding frusto-conical contact surfaces.

The linear actuator preferably includes a motor, for example a stepper motor.

One advantageous embodiment of the device includes:
a sensor responsive to the electrical current flowing in the excitation coil and generating an electrical coupling signal in the event of closure of the magnetic coupling circuit by movement toward each other and sticking of the segments of the connecting rod to each other, and
a control circuit of the linear actuator, receiving the electrical coupling signal, and adapted to interrupt the energization of the linear actuator in the closure direction on receiving said electrical coupling signal.

In this way, regardless of the position of the linear actuator at the time of interruption of the electrical power supply, the linear actuator then returns to a perfectly defined closure position without causing excessive clamping of the sealing valve onto the seat. The closure position of the linear actuator is defined accurately and reproducibly. This avoids all risk of the motor of the linear actuator jamming, as would occur in the event of excessive compression of the sealing valve onto the seat.

In a first simplified embodiment the magnetic coupling circuit and the excitation coil are components of the main body of the device, the assembly constituting a safety shut-off proportional control valve in the event of absence of the electrical power supply.

In this case, the device according to the invention must, to comply with safety standards, further been associated with a safety valve with a safety sealing valve carried by a mobile magnetic core spring-loaded by a return spring into a shut-off position and acted on by a valve opening magnetic field generated by a safety valve magnetic circuit and an actuation coil, the safety valve being connected in series in the fluid circulation path, the safety valve actuation coil being electrically energized simultaneously with the excitation coil of the safety shut-off control valve.

A second embodiment of the device according to the invention further includes a safety valve with a safety sealing valve carried by a mobile magnetic core spring-loaded by a return spring into a shut-off position and acted on by a valve opening magnetic field generated by a safety valve magnetic circuit and an actuation coil, the safety valve being connected in series in the fluid circulation path, the safety valve magnetic circuit being formed to constitute simultaneously the magnetic coupling circuit of the safety shut-off control valve, and the actuation coil simultaneously fulfilling the function of excitation coil of the safety shut-off control valve.

BRIEF DESCRIPTION OF THE DRAWINGS

Other objects, features and advantages of the present invention will emerge from the following description of particular embodiments, given with reference to the accompanying figures, in which.

DESCRIPTION OF THE PREFERRED EMBODIMENTS

Figure 1:
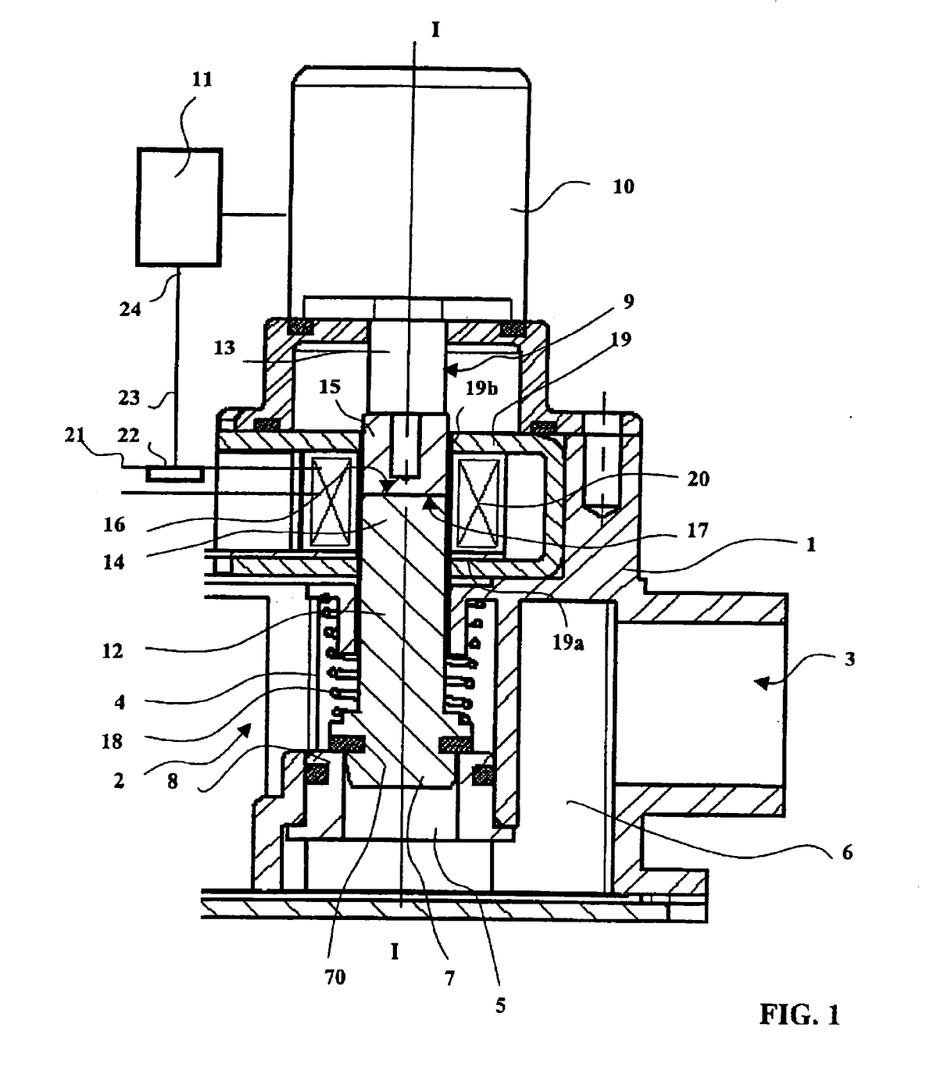
FIG. 1 is a diagrammatic view in section of a first embodiment of a fluid flowrate control and safety device in accordance with the present invention, shown in a shut-off position.
Figure 2:
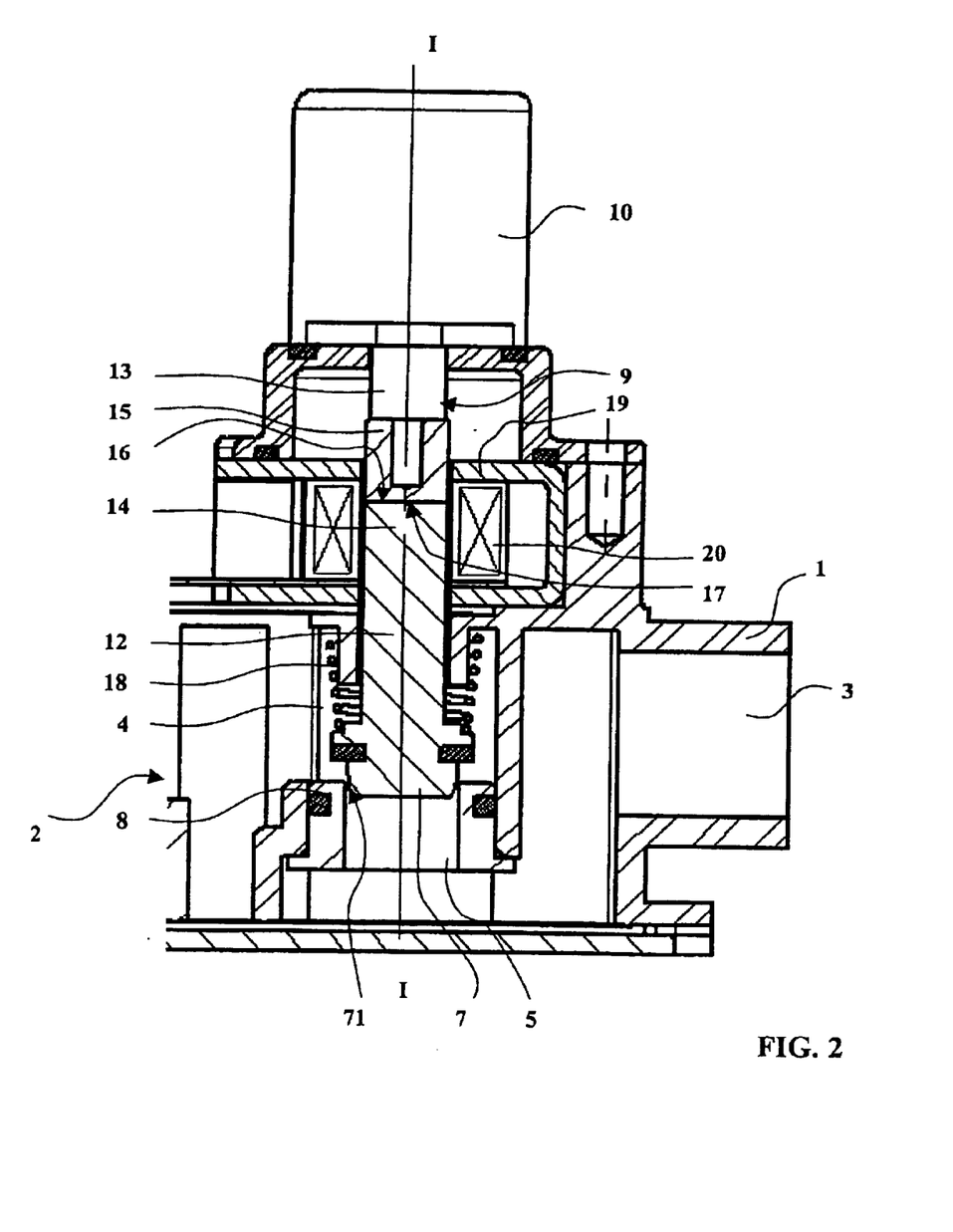
FIG. 2 is a diagrammatic view in section of the FIG. 1 device, in a regulation position.
Figure 3:
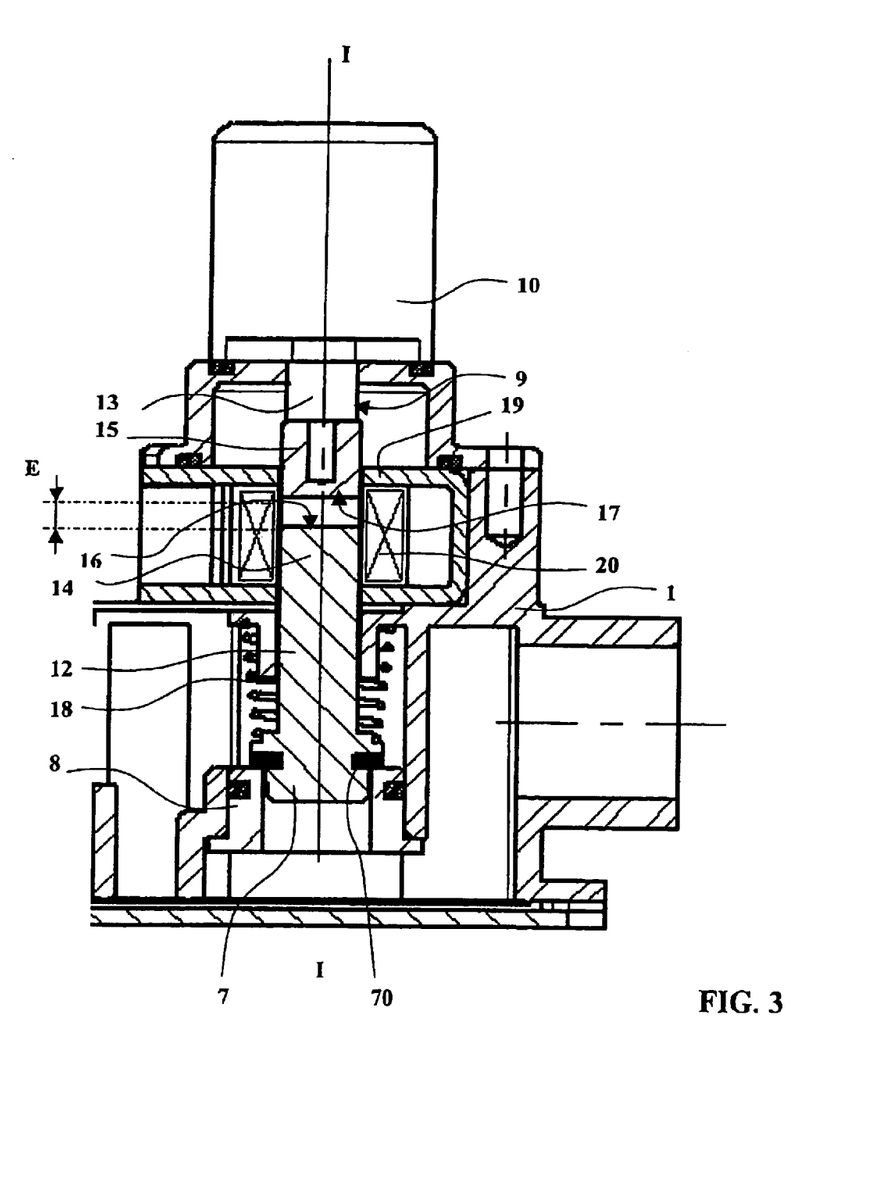
FIG. 3 is a diagrammatic view in section of the FIG. 1 device in a shut-off position in the event of interruption of the electrical power supply.

In the embodiment shown in FIGS. 1 to 3, the fluid flowrate control and safety device provides firstly the function of continuous adjustment of the fluid flowrate, and secondly the function of automatic shut-off in the event of absence of the electrical power supply to the device.

The device comprises a main body 1 in which a fluid circulation path is provided between an inlet 2 and an outlet 3. In the embodiment shown in FIG. 1, the fluid path passes through the inlet 2, and then an upstream chamber 4, a downstream chamber 5, an outlet chamber 6, and finally the outlet 3.

Between the upstream chamber 4 and the downstream chamber 5, a sealing valve 7 moves axially along the axis I—I and cooperates with a seat 8 to determine, in the fluid passage, a fluid passage segment that is adjustable between a fully open position and a shut-off position. FIG. 1 shows the shut-off position.

The sealing valve 7 is directly mechanically connected to a linear actuator 10 by a connecting rod 9. The linear actuator 10 is adapted to move axially the connecting rod 9 and the sealing valve 7 between the fully open position and the shut-off position, and to retain them in any chosen adjustment position between the extreme positions. The linear actuator 10 can comprise an electric motor, for example, supplied with power via a control circuit 11.

The connecting rod 9 is in two separate parts, comprising independent first and second coaxial segments 12 and 13. The first segment 12 is fastened to, or integral with, the sealing valve 7. The second segment 13 is driven by the linear actuator 10. By sliding in the main body 1 along the axis I—I, the two segments 12 and 13 can move axially relative to each other between a relatively close together position (FIG. 1) and a relatively far apart position (FIG. 3).

The first segment 12 of the connecting rod 9 includes at least one ferromagnetic material connecting portion 14. Similarly, the second segment 13 of the connecting rod 9 includes a ferromagnetic material connecting portion 15. The two connecting portions 14 and 15 have respective contact surfaces 16 and 17 facing each other.

A return spring 18 urges the sealing valve 7 and the first segment 12 of the connecting rod 9 in the direction of the seat 8, i.e. away from the second segment 13 of the connecting rod 9, to the point where the solenoid valve is shut-off.

A magnetic coupling circuit 19 with an excitation coil 20 is magnetically coupled to the connecting portions 14 and 15 of the segments 12 and 13 of the connecting rod 9. The magnetic coupling circuit 19 is shaped to generate selectively a magnetic field circulating between the two connecting portions 14 and 15 of the segments 12 and 13. FIG. 1 shows that the excitation coil 20 is an annular coil around the ferromagnetic material connecting portions 14 and 15 of the connecting rod 9. The C-shaped magnetic coupling circuit 19 closes the field lines externally of the excitation coil 20 between the two connecting portions 14 and 15, leaving only a narrow airgap between the distal pole 19a and the proximal pole 19b of the magnetic coupling circuit 19, on the one hand, and the respective connecting portions 14 and 15 of the connecting rod 9, on the other hand. There is a third airgap E at the interface between the respective contact surfaces 16 and 17 of the connecting portions 14 and 15 of the connecting rod 9, shown more clearly in FIG. 3 in the relatively far apart position.

The excitation coil 20 is supplied with electrical current via input conductors 21. When an electric current is present, the excitation coil 20 creates a magnetic field which flows in the magnetic coupling circuit 19 and the connecting portions 14 and 15 to cause mutual magnetic attraction of the segments 12 and 13 of the connecting rod 9 toward each other against a return force exerted by the return spring 18. The excitation coil 20 and its excitation current are chosen so that the magnetic attraction exerted between the two segments 12 and 13 of the connecting rod 9 in the relatively close together position is greater than the return force of the return spring 18.

As a result, supplying the excitation coil 20 with electrical energy maintains the sticking together of the segments 12 and 13 of the connecting rod 9, assuring permanent mechanical coupling of the sealing valve 7 to the linear actuator 10 in the event of longitudinal movements to adjust the fluid flowrate.

Clearly, when the segments 12 and 13 are in the relatively far apart position relative to the airgap E, the magnetic flux generated by the excitation coil 20 is lower because of the presence of the airgap, and it would then be necessary to use a high power excitation coil 20 if the energization of the excitation coil 20 to assure mutual magnetic attraction of the segments 12 and 13 were required to be greater than the return force exerted by the return spring 18. The volume of the device would then be greatly increased, and the production cost would be higher, as would be the consumption of energy to energize the coil.

According to the invention, it is preferred to use a lower power coil, of just sufficient power to keep the segments 12 and 13 stuck to each other when they are in the close together position, the magnetic attraction becoming insufficient to move the segments 12 and 13 toward each other when the airgap E is present. Thanks to the presence of the linear actuator, which can move the segments 12 and 13 relative to each other to bring them into contact with each other after the electrical power supply is restored, the device can then be returned to a state of continuous mechanical connection between the linear actuator and the sealing valve by energization of the excitation coil 20.

The operation of the device is explained further with reference to FIGS. 1 to 3.

In FIG. 1, the device is in a permanently shut-off position: the sealing valve 7 bears on the seat 8 to shut off totally the fluid circulation path between the upstream chamber 4 and the downstream chamber 5. The sealing valve 7 is held in this position by the first segment 12 of the connecting rod 9, which is itself pushed by the spring 18 and by the second segment 13, which is itself loaded by the linear actuator 10. The device retains this state regardless of the energization of the excitation coil 20.

FIG. 2 shows the device in the state of normal fluid flowrate regulation operation: the excitation coil 20 is supplied with electrical current and causes the segments 12 and 13 of the connecting rod 9 to stick permanently to each other. In this case, the linear actuator 10 can move axially along the longitudinal axis I—I of the connecting rod 9 and the sealing valve 7 relative to the seat 8, to adjust continuously the fluid passage section 71 that determines the fluid flowrate in the fluid circulation path. The sealing valve 7 remains coupled to the linear actuator 10 for as long as the excitation coil 20 is energized.

If the supply of electrical power to the excitation coil 20 is interrupted, the device assumes the state shown in FIG. 3 because of the disconnection of the electrical power supply from the excitation coil 20, the magnetic field in the magnetic coupling circuit 19 disappears, as a result of which the magnetic attraction between the segments 12 and 13 of the connecting rod 9 disappears. The second segment 13 remains fixed, its position being determined by the linear actuator 10, which is also fixed because of the absence of electrical power. On the other hand, the first segment 12 is moved by the return spring 18 toward the shut-off position, with the result that the sealing valve 7 automatically comes to bear again on the seat 8, totally shutting off the solenoid valve.

In this FIG. 3 position, the large third airgap E separates the two segments 12 and 13 when the power supply is interrupted with the linear actuator 10 in the fully or partially open position. The segments 12 and 13 are therefore in a relatively far apart position relative to the airgap E.

When the electrical power supply is restored, because of the third airgap E, the magnetic field generated by the excitation coil 20 is insufficient for the magnetic attraction to overcome the return force of the return spring 18 and cause the segments 12 and 13 to stick to each other. The linear actuator 10 must move the second segment 13 in the direction of the first segment 12, moving the contact surfaces 16 and 17 toward each other, until the third airgap E has been reduced sufficiently and the segments 12 and 13 stick to each other. The solenoid valve then resumes its function of fluid flowrate regulation.

FIG. 1 also shows means for automatically commanding stopping of the linear actuator 10 when it returns to the shut-off position, after the electrical power supply is restored. As a matter of fact, from the safety shut-off position shown in FIG. 3, in which the actuator holds the second segment 13 of the connecting rod 9 retracted from the first segment 12 of the connecting rod 9, which is pushed into the shut-off position by the return spring 18, when the electrical power supply is restored it is necessary to control the linear actuator 10 so that it moves the contact surfaces 16 and 17 toward each other, with a sufficiently small distance between them for the magnetic field again to cause the segments 12 and 13 of the connecting rod 9 to stick together. However, it is necessary at the same time to control the stopping of the linear actuator 10 as soon as this sticking is achieved, failing which the linear actuator 10 continues to move and presses the connecting rod 9 and the sealing valve 7 against the seat 8, crushing seals such as the seal 70. Also, if the linear actuator 10 is not stopped when sticking is achieved, the linear actuator 10 can slip and lose its positional registration, which degrades the accuracy of subsequent opening adjustments of the sealing valve 7.

The FIG. 1 embodiment interrupts the supply of power to the actuator as soon as the coupling between the two segments 12 and 13 of the connecting rod 9 is obtained.

To this end, a sensor 22 responsive to the electrical current flowing in the excitation coil 20 is inserted into the input conductors 21 supplying power to the excitation coil 20; it generates at its output 23 an electrical coupling signal when the magnetic coupling circuit 19 is closed by movement toward each other and sticking together of the segments 12 and 13 of the connecting rod 9. The output 23 of the sensor 22 is connected to an input 24 of the control circuit 11. Thus the control circuit 11 of the linear actuator 10 receives the electrical coupling signal and is adapted to interrupt the supply of power to the linear actuator 10 in the direction of closure of the sealing valve 7 on receiving said electrical coupling signal.

In the embodiment shown in FIGS. 1 to 3, the magnetic coupling circuit 19 and the excitation coil 20 are members fitted to the main body 1 of the device, the assembly constituting a control valve with safety shut-off in the event of absence of the electrical power supply.

To satisfy applicable safety standards, the safety shut-off control valve shown in FIGS. 1 to 3 can be associated with a safety valve of any type known to the person skilled in the art, connected in series in the fluid flow path.

For example, said safety shut-off valve can be associated with a safety valve having a sealing valve carried by a mobile magnetic core spring-loaded by a return spring into a shut-off position and acted on by a valve opening magnetic field generated by a magnetic circuit and an actuation coil. In this case, the actuation coil of the safety valve is supplied with electrical power at the same time as the excitation coil 20 of the device shown in FIGS. 1 to 3.

Nevertheless, the embodiment shown in FIGS. 4 to 7 may be preferred as it duplicates control valve safety.

Figure 4:
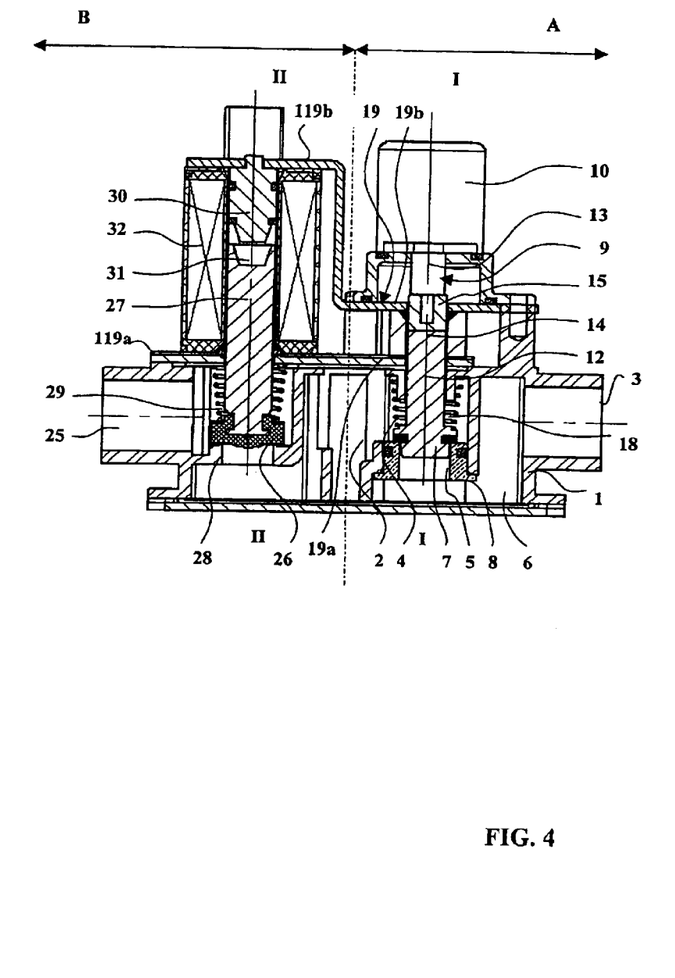
FIG. 4 is a diagrammatic view in section of a second embodiment of a fluid flowrate control and safety device in accordance with the present invention, shown in a fully shut-off position.

In this embodiment, a safety shut-off control valve A, shown in the right-hand half of FIG. 4, is associated with a safety valve B, shown in the left-hand half of FIG. 4.

The safety shut-off control valve A has the same structure as the first embodiment shown in FIGS. 1 to 3. It therefore includes the same components, identified by the same reference numbers, including in particular: the main body 1, the inlet 2, the outlet 3, the upstream chamber 4, the downstream chamber 5, the outlet chamber 6, the sealing valve 7, the seat 8, the connecting rod 9, the linear actuator 10, the first segment 12 of the connecting rod 9, the second segment 13 of the connecting rod 9, the ferromagnetic material connecting portions 14 and 15, the return spring 18, and the magnetic coupling circuit 19 with its distal pole 19a and its proximal pole 19b.

In the embodiment shown in FIGS. 4 to 7, the safety shut-off control valve A differs in terms of the structure of the magnetic coupling circuit 19 and the excitation coil generating the magnetic field in the magnetic coupling circuit 19, in the manner explained hereinafter.

The safety valve B is provided in the same main body 1, and is connected in series into the fluid circulation path between a main inlet 25 and the inlet 2 of the safety shut-off control valve A. The safety valve B includes a safety sealing valve 26 carried by a mobile magnetic core 27 which can slide in the main body 1 along a longitudinal axis II—II to move the safety sealing valve 26 between a shut-off position, shown in FIG. 4, in which it bears on a safety seat 28 to oppose any passage of fluid, and an open position shown in FIGS. 5 and 6, in which it is retracted from the safety seat 28 to allow the fluid to flow from the main inlet 25 to the inlet 2 of the safety shut-off control valve A.

The mobile magnetic core 27 is spring-loaded by a return spring 29 toward a shut-off position.

The mobile magnetic core 27 is associated with a fixed magnetic core 30, disposed coaxially along the axis II—II, and from which it is separated by an airgap 31. An actuation coil 32, supplied with power by an electrical power supply, is disposed around the magnetic cores 27 and 30.

The magnetic coupling circuit 19 comprises, starting from the distal pole 19a, a distal plate 119a, a portion of which is in the vicinity of the mobile magnetic core 27 in order to couple it magnetically to said mobile magnetic core 27. Similarly, the magnetic coupling circuit 19 includes, starting from the proximal pole 19b, a proximal plate 119b, a portion of which is in the vicinity of the fixed magnetic core 30 for the purpose of securing its magnetic coupling. The magnetic field generated by the actuation coil 32 therefore causes mutual attraction of the fixed magnetic core 30 and the mobile magnetic core 27, which attraction tends to reduce the airgap 31 and to cause the two cores 27 and 30 to stick to each other to open the safety valve B. Simultaneously, the magnetic field generated by the actuation coil 32 propagates in the magnetic coupling circuit 19 as far as the poles 19a and 19b, and then in the connecting portions 14 and 15 of the connecting rod 9 to cause the segments 12 and 13 of the connecting rod 9 to stick together, enabling the linear actuator 10 to control the safety shut-off control valve A.

As a result, the magnetic circuit of the safety valve B is shaped to constitute simultaneously the magnetic coupling circuit 19 of the safety shut-off control valve A, and the actuation coil 32 simultaneously fulfils the function of the excitation coil of the safety shut-off control valve A.

The operation of the device is explained further with reference to FIGS. 4 to 7.

In FIG. 4, the device is in a safety closure position: the safety shut-off control valve A is in the fully shut-off position, with the sealing valve 7 bearing against the seat 8. Similarly, the safety valve B is in the shut-off position, the actuation coil is not energized, so that the safety sealing valve 26 and the mobile magnetic core 27 are pushed back by the return spring 29, which presses the safety sealing valve 26 against the safety seat 28.

Figure 5:
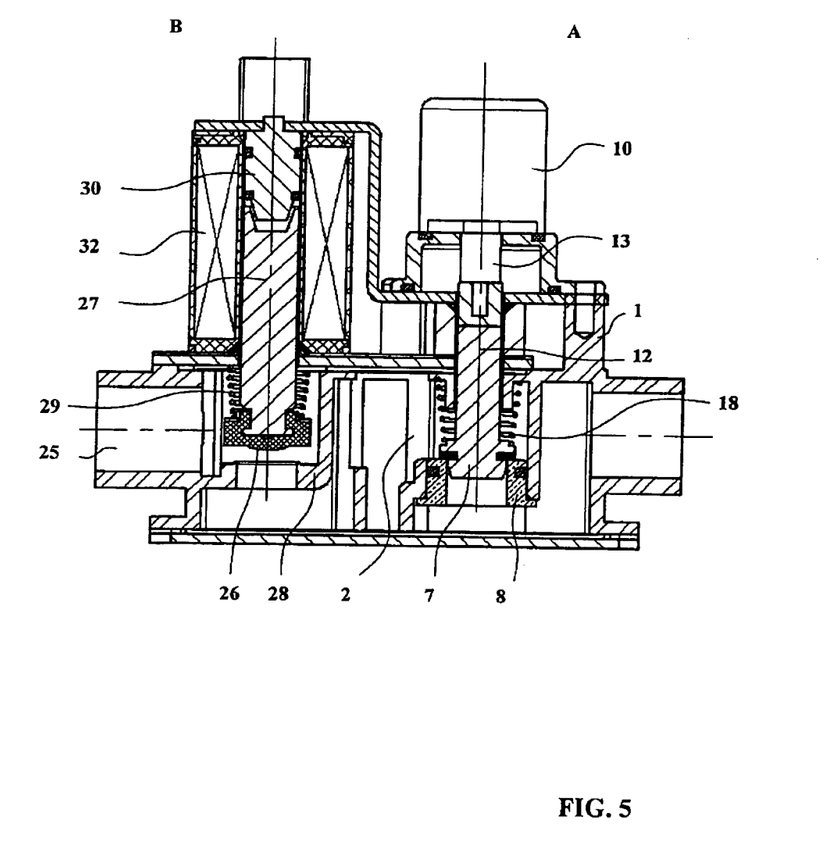
FIG. 5 is a view in section of the FIG. 4 device with the safety solenoid valve open and the adjustment solenoid valve closed.

In FIG. 5, the actuation coil 32 is energized, which causes the mobile magnetic core 27 to be attracted by the fixed magnetic core 30 and retracts the safety sealing valve 26 from the safety seat 28 to open the fluid passage. However, the fluid passage continues to be shut off by the safety shut-off control valve A, the linear actuator 10 of which has not yet been opened.

Figure 6:
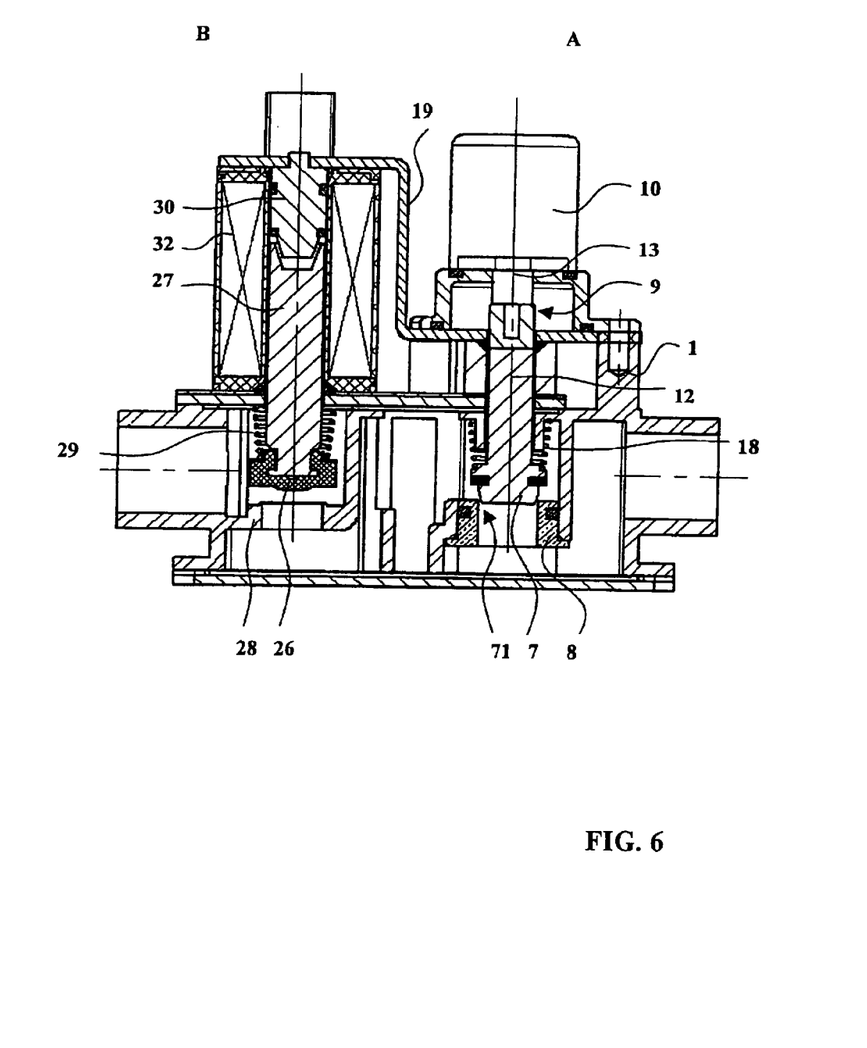
FIG. 6 is a diagrammatic view in section of the FIG. 4 device in a flowrate regulation position.

In FIG. 6, the device is in the regulation state: the actuation coil 32 being supplied with electrical current, it produces a magnetic field which simultaneously opens the safety valve B and causes the segments 12 and 13 of the connecting rod 9 to stick together, the linear actuator 10 efficiently moving the sealing valve 7 relative to the seat 8 at will to adjust the fluid passage section 71.

Figure 7:
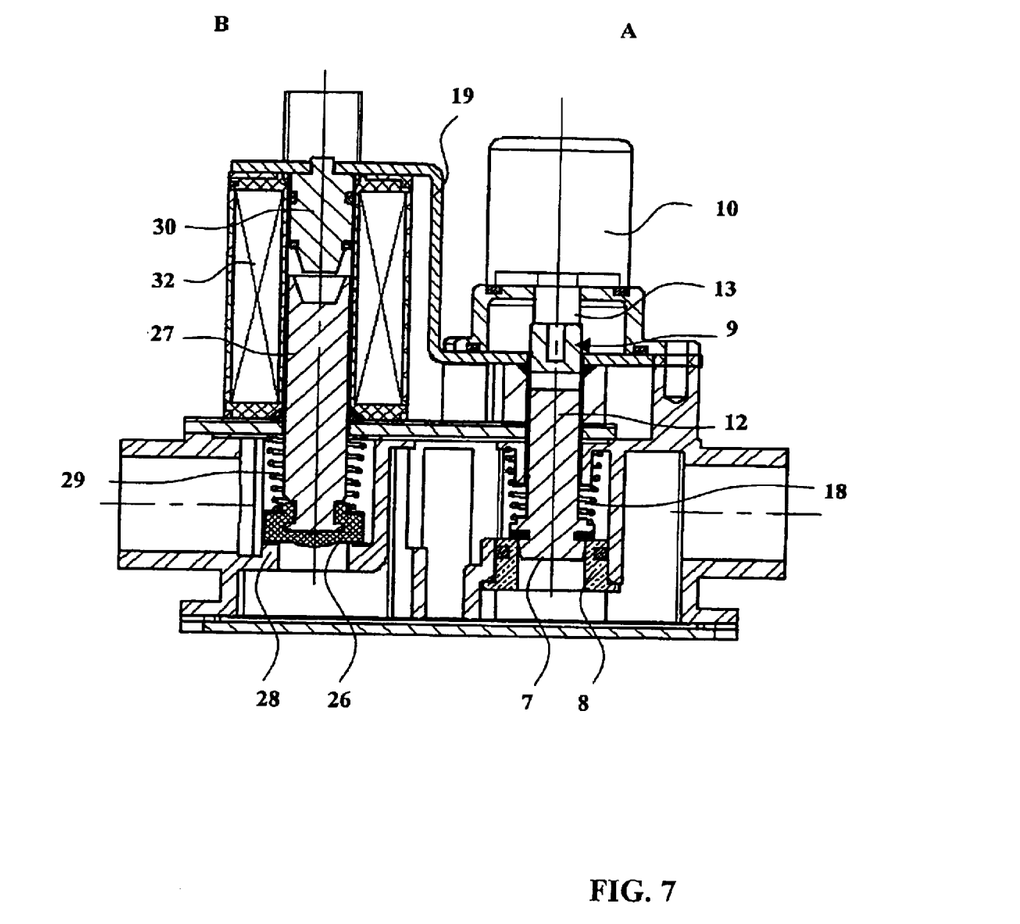
FIG. 7 is a diagrammatic view in section of the FIG. 4 device in a double safety shut-off position in the event of interruption of the electrical power supply.

Starting from the regulation position shown in FIG. 6, if the supply of power to the actuation coil 32 is interrupted, the device assumes the safety closure state shown in FIG. 7: when the magnetic field in the magnetic coupling circuit 19 disappears, the mobile magnetic core 27 and the safety sealing valve 26 are pushed back by the return spring 29 to a closed position, to provide a first safety closure; simultaneously, the disappearance of the magnetic field in the magnetic coupling circuit 19 causes the first segment 12 of the connecting rod 9 to separate from the second segment 13, with a result that the first segment 12 of the connecting rod 9 and the sealing valve 7 are pushed back by the return spring 18 to a shut-off position against the seat 8, to provide automatically a second safety closure.

When the power supply of the actuation coil 32 is restored, the safety valve B opens, but the safety shut-off control valve A remains closed until an operator or an appropriate program causes the linear actuator 10 to operate in the direction that moves the segments 12 and 13 of the connecting rod 9 toward each other, to stick the two segments together, and then in the direction that opens the safety shut-off control valve A.

Clearly this second embodiment is particularly economical for providing a double safety shut-off control valve.

As shown in FIGS. 4 to 7, the airgap 31 between the mobile magnetic core 27 and the fixed magnetic core 30 is frustoconical in shape. This shape facilitates attraction of the mobile magnetic core 27 over a long travel. On the other hand, as seen better in FIG. 3, the third airgap E between the segments 12 and 13 of the connecting rod 9 is limited by two plane contact surfaces 16 and 17, because the traction between the two segments 12 and 13 does not in principle need to be provided over a long travel. Nevertheless, alternatively, respective corresponding frustoconical contact surfaces 16 and 17 could be provided, in the same way as for the airgap 31.

The present invention is not limited to the embodiments explicitly described but includes variants and generalizations thereof within the scope of the following claims.

What is claimed is:

1. A control and safety device for a flow of fluid through a fluid circulation path through a main body of the device, which includes:
   an axial displacement sealing valve cooperating with a seat to determine, in the fluid passage, a fluid passage section adjustable between a fully open position and a shut-off position,
   a linear actuator directly mechanically connected to the sealing valve by an axial displacement connecting rod, for continuously and axially moving the sealing valve facing the seat between its fully open and shut-off positions, enabling continuous adjustment of the position of the sealing valve facing the seat,
   wherein:
   the connecting rod includes a first segment and a second segment which are coaxial and independent, the first segment being integral with the sealing valve, the second segment being driven by the linear actuator, and the two segments being able to move axially relative to each other between a relatively close together position and a relatively far apart position relative to an airgap,
   each of the first and second segments of the connecting rod comprises at least one respective ferromagnetic material connecting portion, two respective contact surfaces of the two connecting portions facing each other,
   a return spring urges the sealing valve and the first segment of the connecting rod away from the second segment of the connecting rod to spring-load the sealing valve into the shut-off position,
   a magnetic coupling circuit with an excitation coil is magnetically coupled to the connecting portions of the segments of the connecting rod and is shaped to generate selectively a magnetic field circulating between the two connecting portions of the segments of the connecting rod, said magnetic field causing mutual magnetic attraction of the segments of the connecting rod toward each other against a return force exerted by the return spring, said magnetic attraction being greater than the return force of the return spring when the two segments are in the relatively close together position,
   the magnetic coupling circuit and the excitation coil are components of the main body of the device,
   with the result that energization of the excitation coil maintains the magnetic attraction of the segments of the connecting rod, ensuring the mechanical coupling of the sealing valve to the linear actuator for its functional movements, and interruption of the supply of power to the excitation coil causes the segments of the connecting rod to be released from each other, ensuring the decoupling of the sealing valve, which is then returned to the shut-off position by the return spring, regardless of the status of the linear actuator.

2. A device according to claim 1, wherein the connecting portions of the segments of the connecting rod have respective plane contact surfaces.

3. A device according to claim 1, wherein the connecting portions of the segments of the connecting rod have respective corresponding frustoconical contact surfaces.

4. A device according to claim 1, wherein the linear actuator includes a motor.

5. A device according to claim 1, further including:
   a sensor responsive to the electrical current flowing in the excitation coil and generating an electrical coupling signal in the event of closure of the magnetic coupling circuit by movement toward each other and sticking of the segments of the connecting rod to each other, and
   a control circuit of the linear actuator, receiving the electrical coupling signal, and adapted to interrupt the energization of the linear actuator in the closure direction on receiving said electrical coupling signal.

6. A device according to claim 1, wherein the assembly comprising a safety shut-off control valve in the event of absence of the electrical power supply.

7. A device according to claim 6, further comprising a safety valve with a safety sealing valve carried by a mobile magnetic core spring-loaded by a return spring into a shut-off position and acted on by a valve opening magnetic field generated by a safety valve magnetic circuit arid an actuation coil, and the safety valve being connected in series in the fluid circulation path, the safety valve actuation coil being electrically energized simultaneously with the excitation coil of the safety shut-off control valve.

8. A device according to claim 1, further including a safety valve with a safety sealing valve carried by a mobile magnetic core spring-loaded by a return spring into a shut-off position and acted on by a valve opening magnetic field generated by a safety valve magnetic circuit and an actuation coil, the safety valve being connected in series in the fluid circulation path, the safety valve magnetic circuit being formed to constitute simultaneously the magnetic coupling circuit of the safety shut-off control valve, and the actuation coil simultaneously fulfilling the function of excitation coil of the safety shut-off control valve.

9. A device according to claim 1, wherein the excitation coil and its excitation current are adapted to be just sufficient to maintain the magnetic attraction of the segments to each other when they are in the close together position.

10. A device according to claim 1, wherein the magnetic coupling circuit comprises a distal pole and a proximal pole, leaving only a narrow airgap between the distal pole and the proximal pole, and the respective connecting portions of the connecting rod.

* * * * *